(12) United States Patent
Li et al.

(10) Patent No.: US 11,731,140 B2
(45) Date of Patent: Aug. 22, 2023

(54) DEDICATED DEVICE FOR SHATTERING PHENOLICS WITH MECHANOCHEMICAL SYNTHESIS AND SHATTERING METHOD THEREOF

(71) Applicant: Intelligent Manufacturing Institute of Hefei University of Technology, Hefei (CN)

(72) Inventors: Xinyu Li, Hefei (CN); Leilei Zhao, Hefei (CN); Di Hu, Hefei (CN); Hui Luo, Hefei (CN); Wenxing Zhai, Hefei (CN)

(73) Assignee: Intelligent Manufacturing Institute of Hefei University of Technology, Hefei (CN)

( * ) Notice: Subject to any disclaimer, the term of this patent is extended or adjusted under 35 U.S.C. 154(b) by 119 days.

(21) Appl. No.: 17/530,965

(22) Filed: Nov. 19, 2021

(65) Prior Publication Data

US 2022/0176383 A1 Jun. 9, 2022

(30) Foreign Application Priority Data

Dec. 4, 2020 (CN) .......................... 202011408269.5

(51) Int. Cl.
  *B02C 18/14* (2006.01)
  *B02C 4/08* (2006.01)
  (Continued)

(52) U.S. Cl.
  CPC .............. *B02C 18/148* (2013.01); *B02C 4/08* (2013.01); *B02C 4/423* (2013.01); *B02C 18/145* (2013.01);
  (Continued)

(58) Field of Classification Search
  CPC ... B02C 25/00; B02C 2018/147; B02C 23/38; B02C 18/148; B02C 18/145
  See application file for complete search history.

(56) References Cited

U.S. PATENT DOCUMENTS

| 5,533 | A | * | 4/1848 | Norton | ................. | B01F 27/271 |
| | | | | | | 241/157 |
| 926,168 | A | * | 6/1909 | Cadwgan | .............. | A01F 29/095 |
| | | | | | | 241/222 |

(Continued)

FOREIGN PATENT DOCUMENTS

DE 3723038 A1 * 1/1989 ............. B02C 18/40

*Primary Examiner* — Debra M Sullivan
*Assistant Examiner* — Matthew Stephens
(74) *Attorney, Agent, or Firm* — Zhigang Ma (57) ABSTRACT

A dedicated device for shattering phenolics with mechanochemical synthesis and a shattering method thereof. The dedicated device includes a supporting frame, a primary shattering device, a secondary shattering device, a three-stage shattering device and an automatic regulating device. The primary shattering device includes a shattering box, a first motor, a first transmission rod, a plurality of tool frames, a plurality of blades, at least one screen mesh, a plurality of fixed cutters and a guide hopper. The secondary shattering device includes a first roller, a second roller, a second transmission rod and a set of helical gears. The three-stage shattering device includes a second motor, a set of tapered blade sets and a plurality of strain sensors. This realizes the regeneration of new mixed materials and the chemical properties of materials control of some micro changes such as material morphology.

10 Claims, 6 Drawing Sheets

(51) Int. Cl.
  *B02C 4/42*   (2006.01)
  *B02C 21/00*  (2006.01)
  *B02C 23/38*  (2006.01)
  *B02C 4/28*   (2006.01)
  *B02C 18/22*  (2006.01)
  *B02C 18/24*  (2006.01)
  *B02C 25/00*  (2006.01)

(52) U.S. Cl.
  CPC ............ *B02C 21/005* (2013.01); *B02C 23/38* (2013.01); *B02C 4/286* (2013.01); *B02C 18/2216* (2013.01); *B02C 18/2291* (2013.01); *B02C 18/24* (2013.01); *B02C 25/00* (2013.01); *B02C 2018/147* (2013.01)

(56) References Cited

U.S. PATENT DOCUMENTS

| | | | |
|---|---|---|---|
| 5,510,076 A * | 4/1996 | Brooks | B02C 18/148 264/141 |
| 2003/0006327 A1 * | 1/2003 | Ryu | B02C 18/16 241/159 |
| 2006/0243833 A1 * | 11/2006 | Nilsson | B02C 25/00 241/30 |
| 2012/0199678 A1 * | 8/2012 | Cassani | B02C 18/0084 241/220 |

* cited by examiner

DEDICATED DEVICE FOR SHATTERING PHENOLICS WITH MECHANOCHEMICAL SYNTHESIS AND SHATTERING METHOD THEREOF

FIELD OF THE INVENTION

The present invention relates to technical field of plastic shattering, and more particularly to a dedicated device for shattering phenolics with mechanochemical synthesis and a shattering method used in the dedicated device.

BACKGROUND OF THE INVENTION

The general concept of shatter is interpreted as the equipment for shattering large-size materials into required sizes. In daily life, some block wastes need to be treated. Large wastes or raw materials need to be shattered by shatter to make the shattered particles meet the requirements, and the shattering efficiency should be high.

In daily life, the shatter only grinds the materials into fine powder, and some micro changes such as chemical properties and material morphology are not controlled. For example, using appropriate mechanical stress to interrupt the cross-linking chemical bond of phenolic plastics, and reducing its molecular weight and making it have a certain plasticity and chemical activity again, so as to realize the regeneration of new mixed materials. Therefore, it is necessary to strictly control the stress between plastic particles to ensure that the weak cross-linked chemical bond can be broken without breaking the main chain of the polymer.

SUMMARY OF THE INVENTION

Therefore, the object of the present invention is to provide a dedicated device for shattering phenolics with mechanochemical synthesis, which realizes the control of some microscopic changes of the chemical properties and material morphology of materials.

Another object of the present invention provides a shattering method used in a dedicated device for shattering phenolics with mechanochemical synthesis, which can change the distance between the conical internal cutter and the conical external cutter, so that ensure the space in the cavity and adjust the stress of phenolic plastics in the shattering cavity.

The present invention provides a dedicated device for shattering phenolics with mechanochemical synthesis, the equipment includes a supporting frame, a primary shattering device, a secondary shattering device, a three-stage shattering device and an automatic regulating device. The primary shattering device includes a shattering box mounted on the top of the supporting frame, a first motor mounted on the top of the supporting frame, a first transmission rod rotationally mounted on the supporting frame, a plurality of tool frames fixed on the side wall of the first transmission rod and arranged around the first transmission, a plurality of blades respectively corresponding to the tool frames, at least one screen mesh, a plurality of fixed cutters and a guide hopper. A feeding inlet and a bottom opening is arranged at the shattering box. The first transmission rod is arranged in the shattering box and parallel to the axial direction of the shattering box. The first motor is used for driving the first transmission rod to rotate. Each blade is mounted on the corresponding tool frame. The screen mesh is cylindrical, connected to the bottom opening and forming a shattering space with the shattering box. The plurality of fixed cutters is mounted on the inner wall of the screen mesh, in an arc shape and having a plurality of cutting strips distributed in the radial direction of the screen mesh. Each blade passes through the screen mesh and two adjacent fixed cutters to impact, squeeze, stir, vibrate and shear the phenolic plastics entering from the feeding inlet, and the phenolic plastics passes through the screen mesh entering the guide hopper. The secondary shattering device includes a first roller, a second roller, a second transmission rod and a set of helical gears. The first roller and the second roller are rotationally mounted on the supporting frame, and the rotation shafts of the two rollers are arranged in parallel, and separated from a shattering gap located below the guide hopper. The first motor drives the first roller or the second roller to rotate through the second transmission rod and the helical gears, so that the phenolic plastics falling from the guide hopper which is squeezed, cut and grinded in the shattering gap. The three-stage shattering device includes a second motor, a set of tapered blade sets and a plurality of strain sensors. The tapered blade sets include a conical internal cutter and a conical external cutter. The conical external cutter is mounted on the supporting frame and moves along the axial movement of the conical external tool. A plurality of inner cutter teeth arranged around the central axis of the conical external cutter is arranged on the inner wall of the conical external cutter. The inner cutter teeth are bent inclined downward, and the protrusion degree from top to bottom is gradually reduced. The automatic regulating device is used for adjusting the distance between the conical internal cutter and the conical external cutter by driving the conical external cutter up and down, so as to adjust the stress of the phenolic plastics in the shattering space.

In the dedicated device of the present invention, the automatic regulating device includes a transverse driving component, a downward inclining block, a plurality of guide rails, a plurality of sliders respectively corresponding to the guide rails, and a plurality of supporting blocks. The included angle between the lower inclined plane of the downward inclining block and the cross section of the conical external cutter is an acute angle. The transverse driving component is used for driving the downward inclining block to move on the radial of the conical external cutter, so as to the conical external cutter can be raised or lowered. The sliding direction of at least one guide rail is arranged vertically with the axial direction of the conical external cutter, and the guide rails are mounted on the supporting frame. Each slider is mounted on the corresponding guide rail, and fixed on the bottom surface of the downward inclining block. At least one guide rail is mounted the lower inclined plane of the downward inclining block, and the corresponding slider is fixed on the side wall of the conical external cutter. The conical external cutter is fixed on the supporting blocks, and each supporting block is fixed on one slider. Some of the guide rails are mounted on the supporting frame, and the sliding direction is arranged parallel to the axial direction of the conical external cutter, so that each supporting block can move along the axial direction of the conical external cutter.

In the dedicated device of the present invention, the automatic regulating device further includes a motor seat mounted on the supporting frame, an adjusting motor mounted on the motor seat, a coupling, a screw rod, a screw sleeve, a fixing plate, a front screw rod seat and a rear screw rod seat. The fixing plate is fixedly connected with the screw sleeve and connected with the downward inclining block. The adjusting motor drives the screw rod rotate through the coupling, so as to make the screw rod and the screw sleeve match to drive the fixing plate to do linear movement. The front screw rod seat and the rear screw rod seat are mounted on the motor seat and used for positioning the screw rod.

In the dedicated device of the present invention, the automatic regulating device further includes an optocoupler and a limiting plate. The optocoupler and the limiting plate are connected and mounted on the supporting frame, and used for limiting the conical external cutter.

In the dedicated device of the present invention, a U-shaped groove structure is arranged on the tool frame, each blade is mounted on the corresponding U-shaped groove structure through a locating pin, and the end is located in the corresponding U-shaped groove.

In the dedicated device of the present invention, the primary shattering device further includes a feeding hopper mounted the shattering box, and the outlet of the feeding hopper is connected with the feeding inlet.

In the dedicated device of the present invention, the primary shattering device further includes a feed pipe. The three-stage shattering device further includes a receiving hopper mounted on the guide hopper and a discharge pipe. The phenolic plastics shattered by the conical internal cutter and the conical external cutter fall into the receiving hopper, and are discharged into an external vibrating screen through the discharge pipe for screening, so as to select qualified materials and unqualified materials. The feed pipe is used for transporting the unqualified materials to the guide hopper.

In the dedicated device of the present invention, the secondary shattering device further includes two groups of drum mounting components. The first roller is rotationally mounted on the supporting frame through one group of the drum mounting components, and the second roller is rotationally mounted on the supporting frame through another group of the drum mounting components. Each group of the drum mounting components includes a bearing, a bearing seat and a bearing upper cover. The bearing is sleeved with the first roller or the second roller. The bearing is located between the bearing seat and the bearing upper cover, and mounted on the supporting frame through the bearing seat.

In the dedicated device of the present invention, the primary shattering device further includes a first driven pulley and a first belt pulley sleeved on the output shaft of the first moto. The secondary shattering device further includes a slave wheel, the first belt pulley drives the first driven pulley and the slave wheel to rotate through two belts respectively. The three-stage shattering device further includes a second belt pulley sleeved on the output shaft of the second motor and a second driven pulley sleeved on the rotating shaft of the conical internal cutter, the second belt pulley drives the second driven pulley to rotate through a belt.

The present invention also provides shattering method used in a dedicated device for shattering phenolics with mechanochemical synthesis, the dedicated device includes a supporting frame, a primary shattering device, a secondary shattering device, a three-stage shattering device and an automatic regulating device. The primary shattering device includes a shattering box mounted on the top of the supporting frame, a first motor mounted on the top of the supporting frame, a first transmission rod rotationally mounted on the supporting frame, a plurality of tool frames fixed on the side wall of the first transmission rod and arranged around the first transmission, a plurality of blades respectively corresponding to the tool frames, at least one screen mesh, a plurality of fixed cutters and a guide hopper. A feeding inlet and a bottom opening is arranged at the shattering box. The first transmission rod is arranged in the shattering box and parallel to the axial direction of the shattering box. The first motor is used for driving the first transmission rod to rotate. Each blade is mounted on the corresponding tool frame. The screen mesh is cylindrical, connected to the bottom opening and forming a shattering space with the shattering box. The plurality of fixed cutters is mounted on the inner wall of the screen mesh, in an arc shape and having a plurality of cutting strips distributed in the radial direction of the screen mesh. Each blade passes through the screen mesh and two adjacent fixed cutters to impact, squeeze, stir, vibrate and shear the phenolic plastics entering from the feeding inlet, and the phenolic plastics passes through the screen mesh entering the guide hopper. The secondary shattering device includes a first roller, a second roller, a second transmission rod and a set of helical gears. The first roller and the second roller are rotationally mounted on the supporting frame, and the rotation shafts of the two rollers are arranged in parallel, and separated from a shattering gap located below the guide hopper. The first motor drives the first roller or the second roller to rotate through the second transmission rod and the helical gears, so that the phenolic plastics falling from the guide hopper which is squeezed, cut and grinded in the shattering gap. The three-stage shattering device includes a second motor, a set of tapered blade sets and a plurality of strain sensors. The tapered blade sets include a conical internal cutter and a conical external cutter. The conical external cutter is mounted on the supporting frame and moves along the axial movement of the conical external tool. A plurality of inner cutter teeth arranged around the central axis of the conical external cutter is arranged on the inner wall of the conical external cutter. The inner cutter teeth are bent inclined downward, and the protrusion degree from top to bottom is gradually reduced. The automatic regulating device is used for adjusting the distance between the conical internal cutter and the conical external cutter by driving the conical external cutter up and down, so as to adjust the stress of the phenolic plastics in the shattering space. The shattering method includes following steps: detecting the stress of the phenolic plastics falling into the shattering space from the shattering gap for transverse shearing and longitudinal extrusion, determining whether the stress being located in a preset interval, when the stress being less than the lower limit of the preset interval, driving the conical external cutter up and down to reduce the distance between the conical internal cutter and the conical external cutter, when the stress being greater than the upper limit of the preset interval, driving the conical external cutter up and down to increase the distance between the conical internal cutter and the conical external cutter, and when the stress being in the preset interval, maintaining the distance between the conical internal cutter and the conical external cutter.

Solution of the present invention, for solving the above problem, is that automatic regulating device can be used to adjust the stress of the phenolic plastics in the shattering space, so that appropriate mechanical stress can be used to break the cross-linked chemical bond of phenolic plastics to reduce its molecular weight, and ensure that the cross-linked chemical bond with weak bond energy can be mainly broken without breaking the main chain of the polymer. This makes it have certain plasticity and chemical activity again, so as to realize the regeneration of new mixed materials and the chemical properties of materials control of some micro changes such as material morphology.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Figure 1:
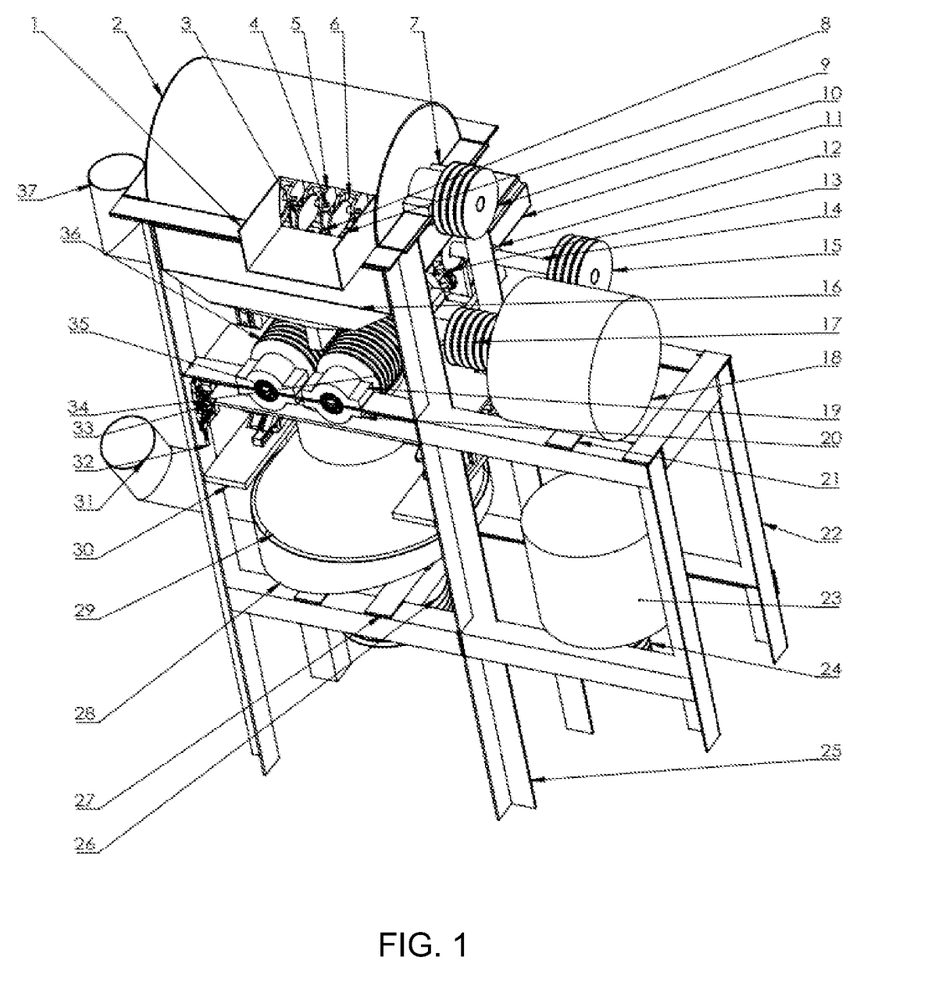
FIG. 1 is a diagram of the structure of the dedicated device for shattering phenolics with mechanochemical synthesis, according to the first embodiment.

Referring to FIG. 1, a dedicated device for shattering phenolics with mechanochemical synthesis is shown as an embodiment. The dedicated device is the equipment for shattering large-size materials into the required size. The equipment includes a supporting frame 25, a primary shattering device, a secondary shattering device, a three-stage shattering device and an automatic regulating device. The three shattering devices can shatter phenolic plastics in turn, and the automatic regulating device controls the three-stage shattering device to break the cross-linking chemical bond with appropriate mechanical stress to reduce its molecular weight, and make it have certain plasticity and chemical activity again.

The supporting frame 25 is used for supporting the whole equipment and includes a motor frame 22 and a mounting frame 27. The supporting frame 25 can be placed directly on the ground or installed on other equipment platforms. The supporting frame 25 can be made of materials with strong compressive capacity and good seismic performance, and the shape and size can be designed according to the actual needs. The motor frame 22 is used for mounting the motor in the equipment, and a damping block 21 is installed below, the mounting frame 27 will be introduced later.

Figure 2:
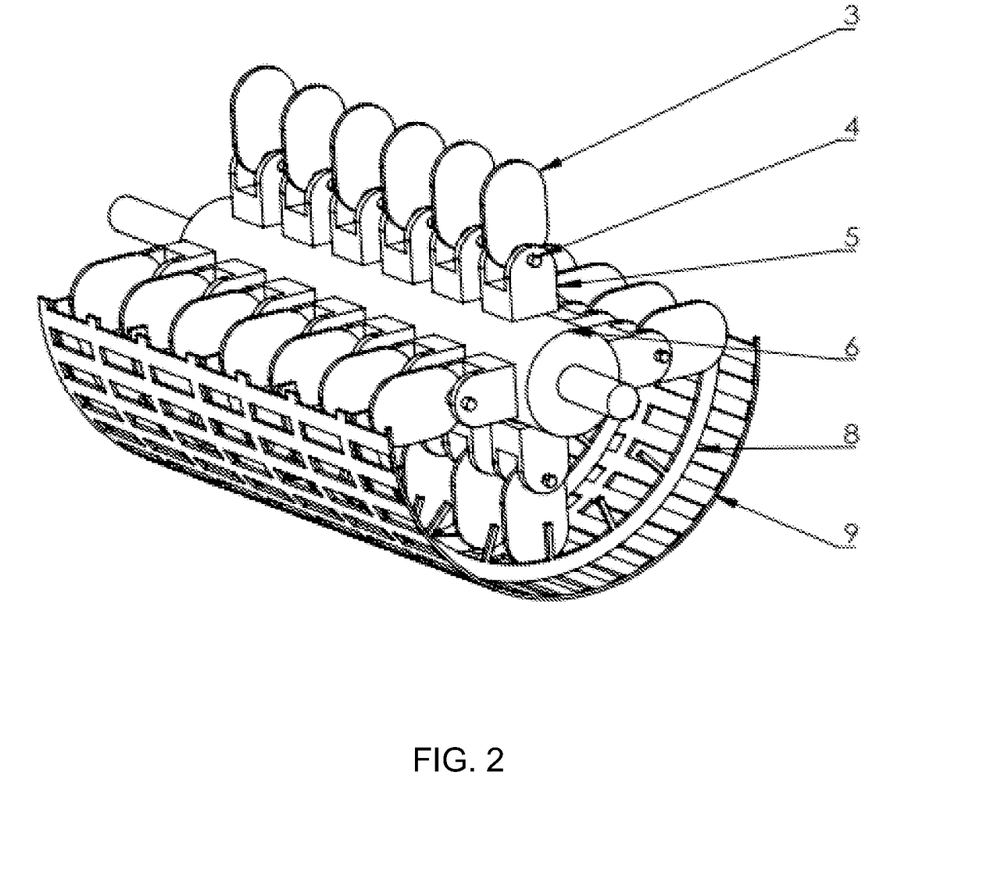
FIG. 2 is a diagram of the structure of the primary shattering device of the dedicated device, according to the first embodiment.

Referring to FIG. 2, the primary shattering device includes a shattering box 2 mounted on the top of the supporting frame 25, a first motor 18 mounted on the top of the supporting frame 25, a first transmission rod 6 rotationally mounted on the supporting frame 25, a plurality of tool frames 4 fixed on the side wall of the first transmission rod 6 and arranged around the first transmission, a plurality of blades 3 respectively corresponding to the tool frames 4, at least one screen mesh 9, a plurality of fixed cutters 8 and a guide hopper 16. In this embodiment, the primary shattering device further includes a feeding hopper 1 mounted the shattering box 2, a feed pipe 37, a first driven pulley 10 and a first belt pulley 17 sleeved on the output shaft of the first moto.

A feeding inlet and a bottom opening is arranged at the shattering box 2. The first transmission rod 6 is arranged in the shattering box 2 and parallel to the axial direction of the shattering box 2, in addition, the end is mounted through first bearing seat 7. The outlet of the feeding hopper 1 is connected with the feeding inlet. The first motor 18 is used for driving the first transmission rod 6 to rotate. The screen mesh 9 is cylindrical, connected to the bottom opening and forming a shattering space with the shattering box 2. The plurality of fixed cutters 8 is mounted on the inner wall of the screen mesh 9, in an arc shape and having a plurality of cutting strips distributed in the radial direction of the screen mesh 9. Each blade 3 is mounted on the corresponding tool frame 4. Each blade 3 passes through the screen mesh 9 and two adjacent fixed cutters 8 to impact, squeeze, stir, vibrate and shear the phenolic plastics entering from the feeding inlet, and the phenolic plastics passes through the screen mesh 9 entering the guide hopper 16. In this embodiment, a U-shaped groove structure is arranged on the tool frame 4, each blade 3 is mounted on the corresponding U-shaped groove structure through a locating pin 5, and the end is located in the corresponding U-shaped groove. The feed pipe 37 is mounted on the guide hopper 16 and used for transporting the unqualified materials to the guide hopper 16.

Figure 3:
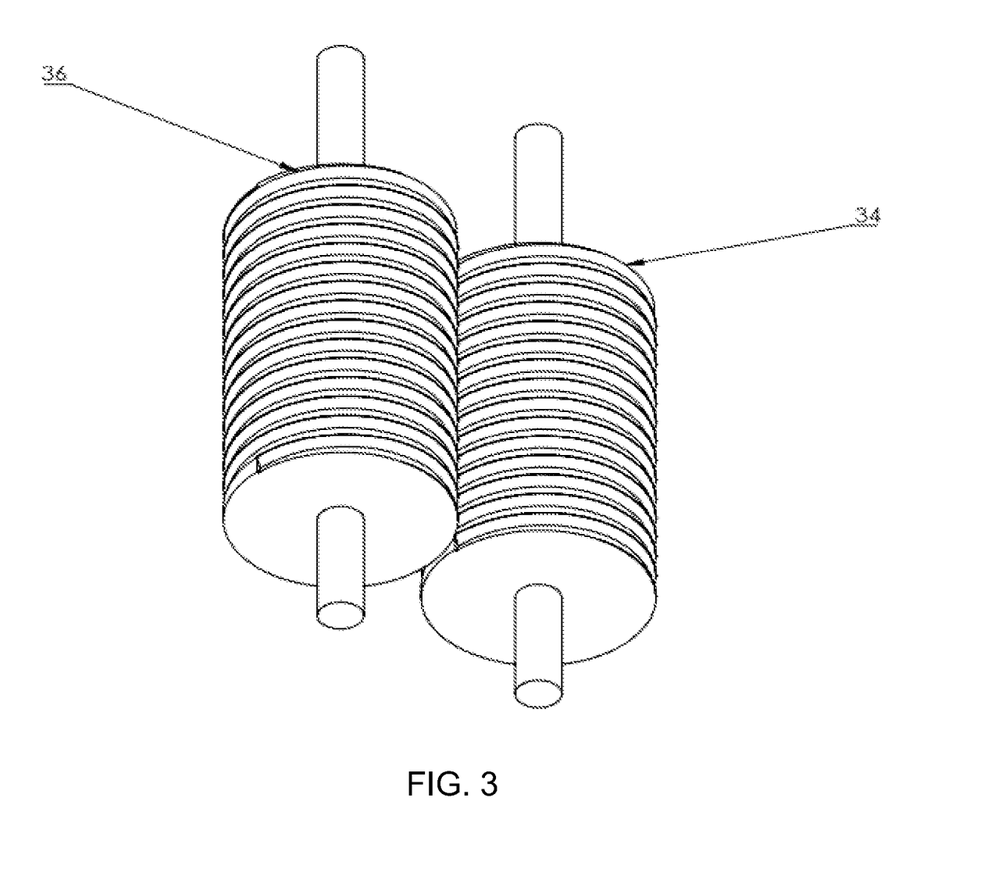
FIG. 3 is a diagram of the structure of the rollers of the secondary shattering device of the dedicated device, according to the first embodiment.

Referring to FIG. 3, the secondary shattering device includes a first roller 34, a second roller 36, a second transmission rod 14 and a set of helical gears 13, can further include two groups of drum mounting components and a slave wheel 15. The first roller 34 and the second roller 36 are rotationally mounted on the supporting frame 25, and the rotation shafts of the two rollers are arranged in parallel, and separated from a shattering gap located below the guide hopper 16. The first motor 18 drives the first roller 34 or the second roller 36 to rotate through the second transmission rod 14 and the helical gears 13, so that the phenolic plastics falling from the guide hopper 16 which is squeezed, cut and grinded in the shattering gap. The second transmission rod 14 is fixed on the supporting frame 25 through the fixing seat 12 and can rotate relative to the supporting frame 25. The first belt pulley 17 drives the first driven pulley 10 and the slave wheel 15 to rotate through two belts respectively.

The first roller 34 is rotationally mounted on the supporting frame 25 through one group of the drum mounting components, and the second roller 36 is rotationally mounted on the supporting frame 25 through another group of the drum mounting components. Each group of the drum mounting components includes a bearing 35, a second bearing seat 20 and a bearing 35 upper cover 19. The bearing 35 is sleeved with the first roller 34 or the second roller 36. The bearing 35 is located between the second bearing seat 20 and the bearing 35 upper cover 19, and mounted on the supporting frame 25 through the second bearing seat 20. In this way, the drum mounting components can well ensure that the first roller 34 and the second roller 36 run on the supporting frame 25, and some protective structures can be set to prevent broken particles from entering the drum mounting components assembly.

Referring to FIGS. 4, 5, 6 and 7, the three-stage shattering device includes a second motor 23, a set of tapered blade sets 29 and a plurality of strain sensors 40. In this embodiment, the three-stage shattering device further includes a receiving hopper 28 mounted on the guide hopper 16, a discharge pipe 31, a second belt pulley 24 sleeved on the output shaft of the second motor 23 and a second driven pulley 26 sleeved on the rotating shaft of the conical internal cutter 39, the second belt pulley 24 drives the second driven pulley 26 to rotate through a belt. The tapered blade sets 29 include a conical internal cutter 39 and a conical external cutter 38. The conical external cutter 38 is mounted on the supporting frame 25 and moves along the axial movement of the conical external tool. A plurality of inner cutter teeth arranged around the central axis of the conical external cutter 38 is arranged on the inner wall of the conical external cutter 38. The inner cutter teeth are bent inclined downward, and the protrusion degree from top to bottom is gradually reduced.

The tapered blade sets 29 are a conical cylindrical structure, the cutter teeth are bent obliquely downward, and the cutter teeth are becoming shallower and shallower. And the cutter teeth of the conical external cutter 38 are becoming shallower and shallower from top to bottom. In this way, the material is subjected to transverse shear force and longitudinal extrusion force, and the design of shallower and shallower cutter teeth can make the material grind more and more broken.

Figure 4:
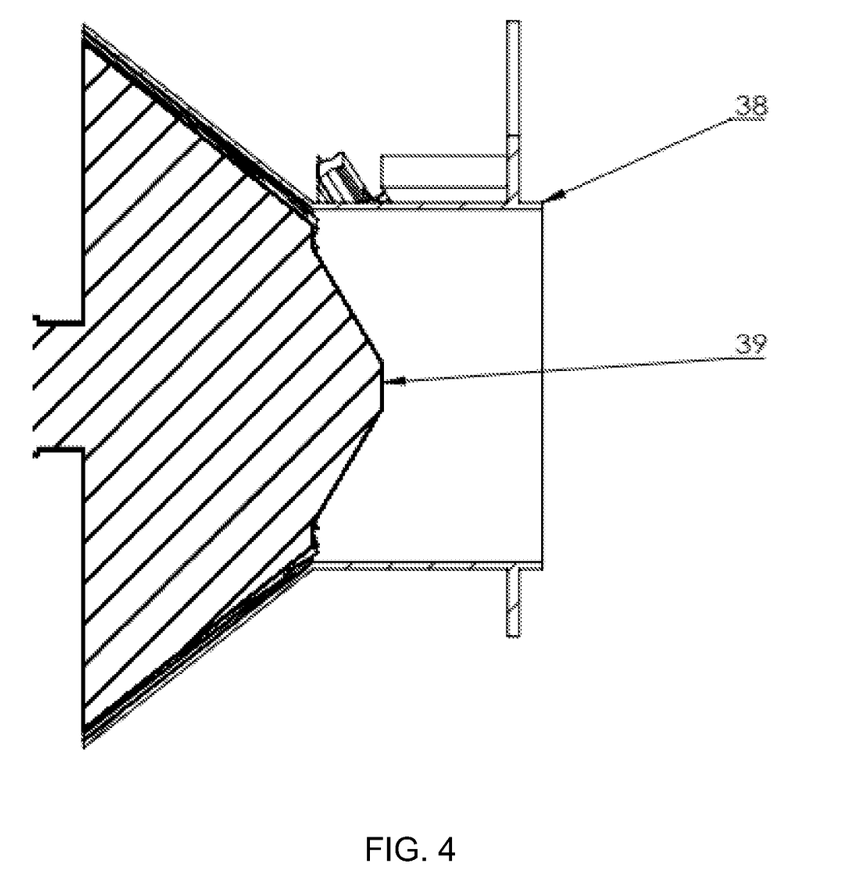
FIG. 4 is a diagram of the structure of the tapered blade sets of the three-stage shattering device of the dedicated device, according to the first embodiment.
Figure 5:
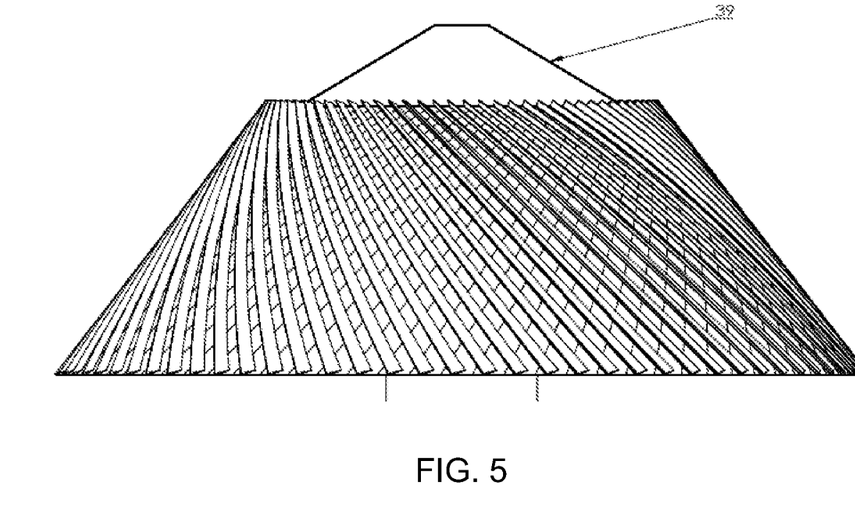
FIG. 5 is a diagram of the structure of the conical internal cutter of the tapered blade sets of the three-stage shattering device of the dedicated device, according to the first embodiment.
Figure 6:
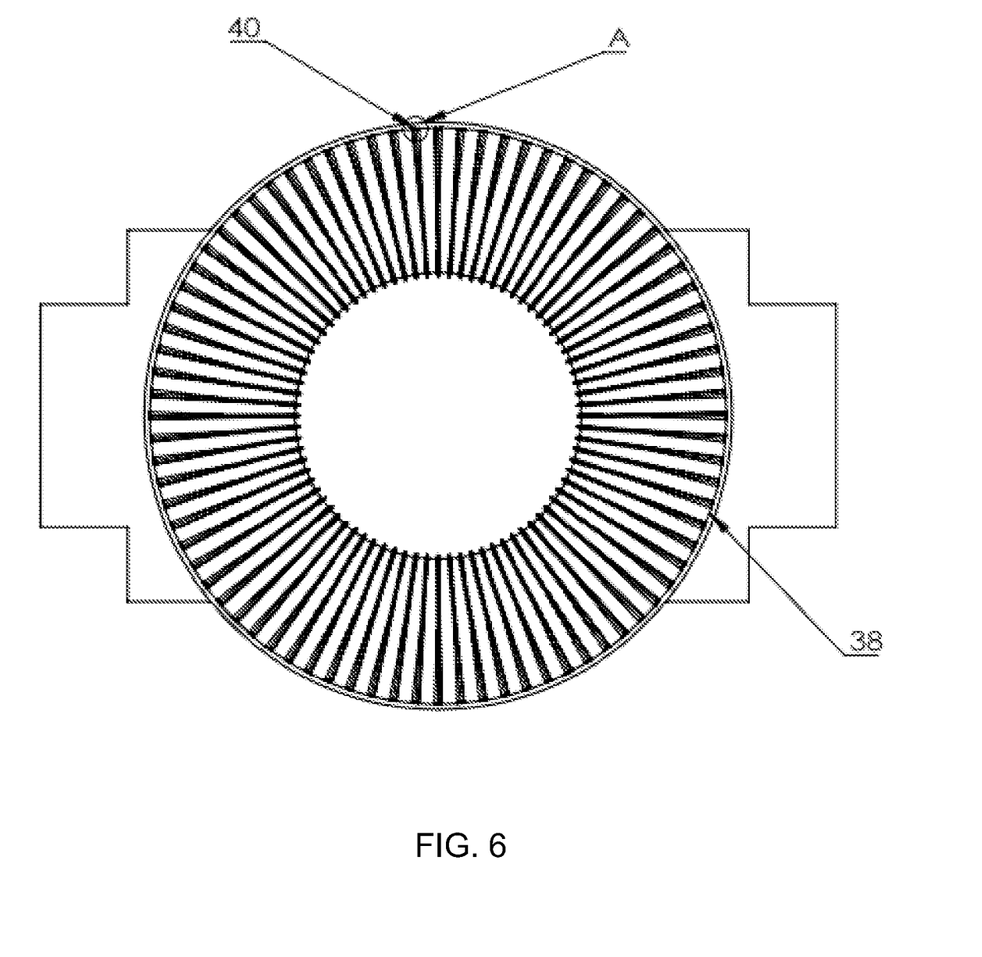
FIG. 6 is a contact diagram of the conical internal cutter and strain sensors of the tapered blade sets of the three-stage shattering device of the dedicated device, according to the first embodiment.
Figure 7:
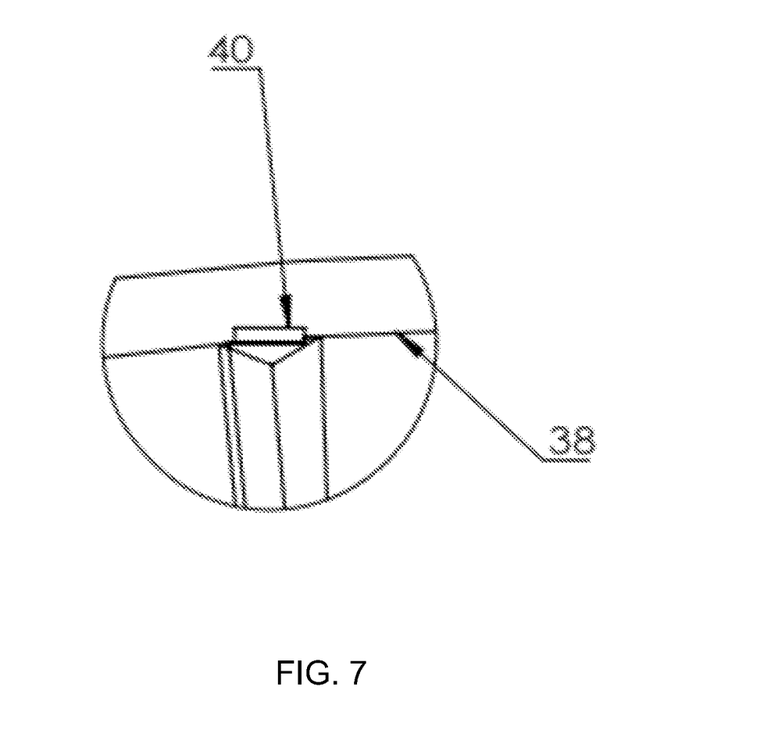
FIG. 7 is a diagram of the structure of the conical internal cutter of the three-stage shattering device of the dedicated device, according to the first embodiment.

The receiving hopper 28 is fixed on the supporting frame 25 and used for receiving materials. The phenolic plastics shattered by the conical internal cutter 39 and the conical external cutter 38 fall into the receiving hopper 28, and are discharged into an external vibrating screen through the discharge pipe 31 for screening, so as to select qualified materials and unqualified materials.

The phenolic plastics shattered by the conical internal cutter 39 and the conical external cutter 38 are transported to the external vibrating screen through the receiving hopper 28 and discharge pipe 31 for drying and separation. The screened unqualified materials will further return to the guide hopper 16 through the receiving hopper 28 and be shattered again by the secondary shattering device and the three-stage shattering device. In this way, the phenolic plastics can be fully shattered repeatedly, and this will improve the shattering rate and shattering quality of phenolic plastics and reduce material waste.

Figure 8:
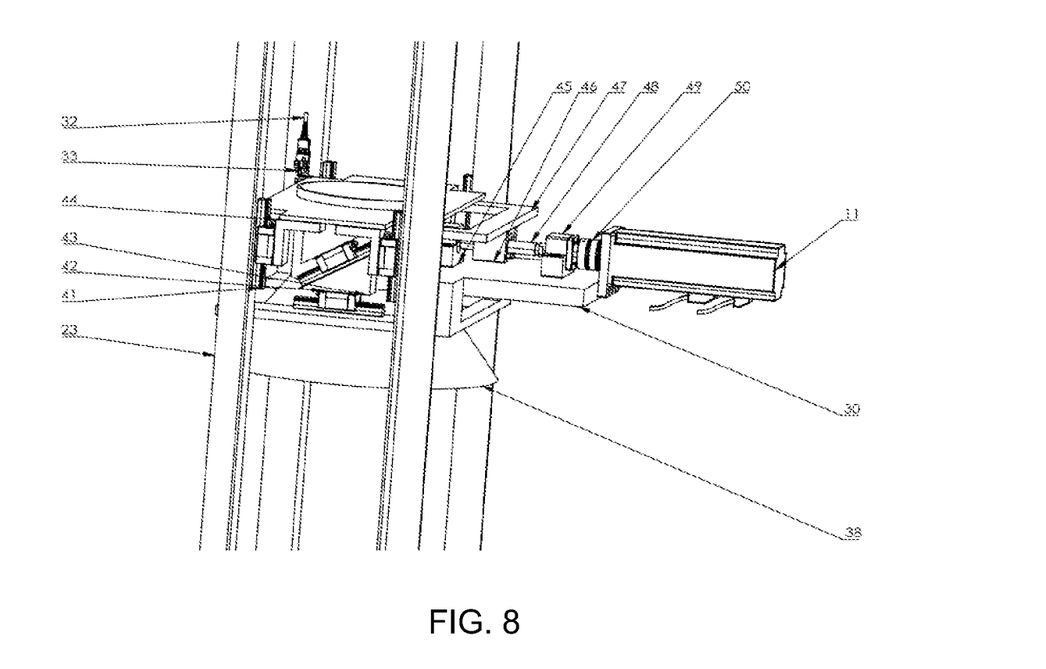
FIG. 8 is a diagram of the structure of the automatic regulating device of the dedicated device, according to the first embodiment.

Referring to FIG. 8, the automatic regulating device is used for adjusting the distance between the conical internal cutter 39 and the conical external cutter 38 by driving the conical external cutter 38 up and down, so as to adjust the stress of the phenolic plastics in the shattering space. The automatic regulating device includes a transverse driving component, a downward inclining block 43, a plurality of guide rails 41, a plurality of sliders 42 respectively corresponding to the guide rails 41, and a plurality of supporting blocks 44.

The included angle between the lower inclined plane of the downward inclining block 43 and the cross section of the conical external cutter 38 is an acute angle. The transverse driving component is used for driving the downward inclining block 43 to move on the radial of the conical external cutter 38, so as to the conical external cutter 38 can be raised or lowered. The sliding direction of at least one guide rail is arranged vertically with the axial direction of the conical external cutter 38, and the guide rails 41 are mounted on the supporting frame 25. Each slider 42 is mounted on the corresponding guide rail, and fixed on the bottom surface of the downward inclining block 43. At least one guide rail is mounted the lower inclined plane of the downward inclining block 43, and the corresponding slider 42 is fixed on the side wall of the conical external cutter 38. The conical external cutter 38 is fixed on the supporting blocks 44, and each supporting block is fixed on one slider 42. Some of the guide rails 41 are mounted on the supporting frame 25, and the sliding direction is arranged parallel to the axial direction of the conical external cutter 38, so that each supporting block can move along the axial direction of the conical external cutter 38.

The automatic regulating device can further include a motor seat 30 mounted on the supporting frame 25, an adjusting motor 11 mounted on the motor seat 30, a coupling 50, a screw rod 48, a screw sleeve 46, a fixing plate 47, a front screw rod seat 49 and a rear screw rod seat 45. The fixing plate 47 is fixedly connected with the screw sleeve 46 and connected with the downward inclining block 43. The adjusting motor 11 drives the screw rod 48 rotate through the coupling 50, so as to make the screw rod 48 and the screw sleeve 46 match to drive the fixing plate 47 to do linear movement. The front screw rod seat 49 and the rear screw rod seat 45 are mounted on the motor seat 30 and used for positioning the screw rod 48. In some other embodiments, the automatic regulating device further includes an optocoupler 32 and a limiting plate 33. The optocoupler 32 and the limiting plate 33 are connected and mounted on the supporting frame 25, and used for limiting the conical external cutter 38.

The downward inclining block 43 moves horizontally under the action of the transverse driving component drive assembly, and then the conical outer tool can be lifted and lowered without horizontal movement through the sliders 42, guide rails 41 and supporting blocks 44, so that the vertical position of the conical external cutter 38 can be accurately changed, and the position can be limited through the optocoupler 32 and the limit plate to avoid accidents.

As described above, the dedicated device drives the first transmission rod 6 through the first motor 18 to make the blade 3 violently impact, squeeze, stir, vibrate and shear the phenolic plastics on the screen mesh 9, so as to primary shatter the phenolic plastics to make the tissue crisp. Then, the crisp phenolic plastics are screened through the screen mesh 9 and enter from the guide hopper 16 to the first roller 34 and the second roller 36 for extrusion, shearing and grinding. Due to the loose tissue of the shattered material in the previous step, it is more conducive to grinding, and the large particles are damaged again under the extrusion pressure, the tissue is loose and the particles become smaller, and continue to fall into tapered blade sets 29 with the action of gravity. In the shattering cavity between the conical internal cutter 39 and the conical external cutter 38, the phenolic plastics are extruded downward and sheared and ground at the same time, so as to shatter the materials rapidly, which greatly improves the shattering efficiency and shattering effect.

The automatic regulating device can be used to adjust the stress of the phenolic plastics in the shattering space, so that appropriate mechanical stress can be used to break the cross-linked chemical bond of phenolic plastics to reduce its molecular weight, and ensure that the cross-linked chemical bond with weak bond energy can be mainly broken without breaking the main chain of the polymer. This makes it have certain plasticity and chemical activity again, so as to realize the regeneration of new mixed materials and the chemical properties of materials Control of some micro changes such as material morphology.

Second Embodiment

A shattering method used in a dedicated device for shattering phenolics with mechanochemical synthesis is shown as an embodiment, and the dedicated device can be the equipment in the first embodiment. In other embodiments, the dedicated device includes a supporting frame 25, a primary shattering device, a secondary shattering device, a three-stage shattering device and an automatic regulating device. The primary shattering device includes a shattering box 2 mounted on the top of the supporting frame 25, a first motor 18 mounted on the top of the supporting frame 25, a first transmission rod 6 rotationally mounted on the supporting frame 25, a plurality of tool frames 4 fixed on the side wall of the first transmission rod 6 and arranged around the first transmission, a plurality of blades 3 respectively corresponding to the tool frames 4, at least one screen mesh 9, a plurality of fixed cutters 8 and a guide hopper 16. A feeding inlet and a bottom opening is arranged at the shattering box 2. The first transmission rod 6 is arranged in the shattering box 2 and parallel to the axial direction of the shattering box 2. The first motor 18 is used for driving the first transmission rod 6 to rotate. Each blade 3 is mounted on the corresponding tool frame 4. The screen mesh 9 is cylindrical, connected to the bottom opening and forming a shattering space with the shattering box 2. The plurality of fixed cutters 8 is mounted on the inner wall of the screen mesh 9, in an arc shape and having a plurality of cutting strips distributed in the radial direction of the screen mesh 9. Each blade 3 passes through the screen mesh 9 and two adjacent fixed cutters 8 to impact, squeeze, stir, vibrate and shear the phenolic plastics entering from the feeding inlet, and the phenolic plastics passes through the screen mesh 9 entering the guide hopper 16. The secondary shattering device includes a first roller 34, a second roller 36, a second transmission rod 14 and a set of helical gears 13. The first roller 34 and the second roller 36 are rotationally mounted on the supporting frame 25, and the rotation shafts of the two rollers are arranged in parallel, and separated from a shattering gap located below the guide hopper 16. The first motor 18 drives the first roller 34 or the second roller 36 to rotate through the second transmission rod 14 and the helical gears 13, so that the phenolic plastics falling from the guide hopper 16 which is squeezed, cut and grinded in the shattering gap. The three-stage shattering device includes a second motor 23, a set of tapered blade sets 29 and a plurality of strain sensors 40. The tapered blade sets 29 include a conical internal cutter 39 and a conical external cutter 38. The conical external cutter 38 is mounted on the supporting frame 25 and moves along the axial movement of the conical external tool. A plurality of inner cutter teeth arranged around the central axis of the conical external cutter 38 is arranged on the inner wall of the conical external cutter 38. The inner cutter teeth are bent inclined downward, and the protrusion degree from top to bottom is gradually reduced. The automatic regulating device is used for adjusting the distance between the conical internal cutter 39 and the conical external cutter 38 by driving the conical external cutter 38 up and down, so as to adjust the stress of the phenolic plastics in the shattering space.

In this embodiment, the shattering method includes following steps.

Detecting the stress of the phenolic plastics falling into the shattering space from the shattering gap for transverse shearing and longitudinal extrusion. In this embodiment, the stress on the phenolic plastic can be obtained through a plurality of sensors, which are evenly distributed along the conical external cutter 38 to monitor the stress on the phenolic plastic in the cavity at any time.

Determining whether the stress being located in a preset interval. The preset interval has lower and upper limits, which can be set according to actual needs, especially according to the situation of phenolic plastics and the appropriate mechanical stress required to break the cross-linked chemical bond. As long as the stress is within this interval, the dedicated device can ensure that the cross-linked chemical bond with weak bond energy can be mainly broken without breaking the main chain of the polymer.

When the stress being less than the lower limit of the preset interval, driving the conical external cutter 38 up and down to reduce the distance between the conical internal cutter 39 and the conical external cutter 38. At this time, the stress is too small, indicating that the mechanical stress on the cross-linked chemical bond is insufficient, and the extrusion and shear need to be strengthened. Therefore, the spacing between the conical internal cutter 39 and the conical external cutter 38 can be reduced, so as to enhance the shattering effect.

When the stress being greater than the upper limit of the preset interval, driving the conical external cutter 38 up and down to increase the distance between the conical internal cutter 39 and the conical external cutter 38. At this time, due to excessive stress, the main chain of the polymer may be broken. Therefore, it is necessary to reduce the mechanical stress to reduce the extrusion and shear force, which can be achieved by increasing the spacing between the conical internal cutter 39 and the conical external cutter 38.

When the stress being in the preset interval, maintaining the distance between the conical internal cutter 39 and the conical external cutter 38. At this time, due to the appropriate stress, it can ensure that the cross-linked chemical bond with weak bond breaking energy can be broken without breaking the main chain of the polymer, so as to break the required phenolic plastic.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dedicated device for shattering phenolics with mechanochemical synthesis, comprising:
    a supporting frame;
    a primary shattering device, comprising:
        a shattering box mounted on the top of the supporting frame; a feeding inlet and a bottom opening being arranged at the shattering box;
        a first motor mounted on the top of the supporting frame;
        a first transmission rod rotationally mounted on the supporting frame, the first transmission rod being arranged in the shattering box and parallel to the axial direction of the shattering box; the first motor being used for driving the first transmission rod to rotate;

a plurality of tool frames fixed on the side wall of the first transmission rod and arranged around the first transmission;

a plurality of blades respectively corresponding to the tool frames; each blade being mounted on the corresponding tool frame;

at least one screen mesh; the screen mesh being cylindrical, connected to the bottom opening and forming a shattering space with the shattering box;

a plurality of fixed cutters, which being mounted on the inner wall of the screen mesh, in an arc shape and having a plurality of cutting strips distributed in the radial direction of the screen mesh; and a guide hopper; each blade passing through the screen mesh and two adjacent fixed cutters to impact, squeeze, stir, vibrate and shear the phenolic plastics entering from the feeding inlet, and the phenolic plastics passing through the screen mesh entering the guide hopper;

a secondary shattering device, comprising:
a first roller;
a second roller; the first roller and the second roller being rotationally mounted on the supporting frame, and the rotation shafts of the two rollers being arranged in parallel, and separated from a shattering gap located below the guide hopper;
a second transmission rod; and
a set of helical gears; the first motor driving the first roller or the second roller to rotate through the second transmission rod and the helical gears, so that the phenolic plastics falling from the guide hopper being squeezed, cut and grinded in the shattering gap;

a three-stage shattering device, comprising:
a second motor;
a set of tapered blade sets; the tapered blade sets comprising a conical internal cutter and a conical external cutter; the conical external cutter being mounted on the supporting frame and moving along the axial movement of the conical external tool; a plurality of inner cutter teeth arranged around the central axis of the conical external cutter being arranged on the inner wall of the conical external cutter; the inner cutter teeth being bent inclined downward, and the protrusion degree from top to bottom being gradually reduced; and
a plurality of strain sensors; the strain sensors being mounted at the tooth root of the conical external cutter, and being uniformly distributed in the ring, and used for detecting the stress of the phenolic plastics falling into the shattering space from the shattering gap for transverse shearing and longitudinal extrusion; and an automatic regulating device, being used for adjusting the distance between the conical internal cutter and the conical external cutter by driving the conical external cutter up and down, so as to adjust the stress of the phenolic plastics in the shattering space.

2. The dedicated device according to claim 1, wherein the automatic regulating device comprises:
a transverse driving component;
a downward inclining block; the included angle between the lower inclined plane of the downward inclining block and the cross section of the conical external cutter is an acute angle; the transverse driving component is used for driving the downward inclining block to move on the radial of the conical external cutter, so as to the conical external cutter can be raised or lowered;
a plurality of guide rails; the sliding direction of at least one guide rail is arranged vertically with the axial direction of the conical external cutter, and the guide rails are mounted on the supporting frame;
a plurality of sliders respectively corresponding to the guide rails; each slider is mounted on the corresponding guide rail, and fixed on the bottom surface of the downward inclining block; at least one guide rail is mounted the lower inclined plane of the downward inclining block, and the corresponding slider is fixed on the side wall of the conical external cutter; and
a plurality of supporting blocks; the conical external cutter is fixed on the supporting blocks, and each supporting block is fixed on one slider; some of the guide rails are mounted on the supporting frame, and the sliding direction is arranged parallel to the axial direction of the conical external cutter, so that each supporting block can move along the axial direction of the conical external cutter.

3. The dedicated device according to claim 2, wherein the automatic regulating device further comprises:
a motor seat mounted on the supporting frame;
an adjusting motor mounted on the motor seat;
a coupling;
a screw rod;
a screw sleeve;
a fixing plate; the fixing plate is fixedly connected with the screw sleeve and connected with the downward inclining block; the adjusting motor drives the screw rod rotate through the coupling, so as to make the screw rod and the screw sleeve match to drive the fixing plate to do linear movement;
a front screw rod seat; and
a rear screw rod seat; the front screw rod seat and the rear screw rod seat are mounted on the motor seat and used for positioning the screw rod.

4. The dedicated device according to claim 3, wherein the automatic regulating device further comprises:
an optocoupler; and
a limiting plate; the optocoupler and the limiting plate are connected and mounted on the supporting frame, and used for limiting the conical external cutter.

5. The dedicated device according to claim 1, wherein a U-shaped groove structure is arranged on the tool frame, each blade is mounted on the corresponding U-shaped groove structure through a locating pin, and the end is located in the corresponding U-shaped groove.

6. The dedicated device according to claim 1, wherein the primary shattering device further comprises:
a feeding hopper mounted the shattering box, and the outlet of the feeding hopper is connected with the feeding inlet.

7. The dedicated device according to claim 1, wherein the primary shattering device further comprises:
a feed pipe;
the three-stage shattering device further comprises:
a receiving hopper mounted on the guide hopper; and
a discharge pipe; the phenolic plastics shattered by the conical internal cutter and the conical external cutter fall into the receiving hopper, and are discharged into an external vibrating screen through the discharge pipe for screening, so as to select qualified materials and unqualified materials; the feed pipe is used for transporting the unqualified materials to the guide hopper.

8. The dedicated device according to claim 1, wherein the secondary shattering device further comprises:
two groups of drum mounting components; the first roller is rotationally mounted on the supporting frame through one group of the drum mounting components, and the second roller is rotationally mounted on the supporting frame through another group of the drum mounting components; each group of the drum mounting components comprises a bearing, a bearing seat and a bearing upper cover; the bearing is sleeved with the first roller or the second roller; the bearing is located between the bearing seat and the bearing upper cover, and mounted on the supporting frame through the bearing seat.

9. The dedicated device according to claim 1, wherein the primary shattering device further comprises:
a first driven pulley; and
a first belt pulley sleeved on the output shaft of the first motor;
the secondary shattering device further comprises:
a slave wheel; the first belt pulley drives the first driven pulley and the slave wheel to rotate through two belts respectively;
the three-stage shattering device further comprises:
a second belt pulley sleeved on the output shaft of the second motor; and
a second driven pulley sleeved on the rotating shaft of the conical internal cutter;
the second belt pulley drives the second driven pulley to rotate through a belt.

10. A shattering method used in a dedicated device for shattering phenolics with mechanochemical synthesis, the dedicated device comprising:
a supporting frame;
a primary shattering device, comprising:
a shattering box mounted on the top of the supporting frame; a feeding inlet and a bottom opening being arranged at the shattering box;
a first motor mounted on the top of the supporting frame;
a first transmission rod rotationally mounted on the supporting frame, the first transmission rod being arranged in the shattering box and parallel to the axial direction of the shattering box; the first motor being used for driving the first transmission rod to rotate;
a plurality of tool frames fixed on the side wall of the first transmission rod and arranged around the first transmission;
a plurality of blades respectively corresponding to the tool frames; each blade being mounted on the corresponding tool frame;
at least one screen mesh; the screen mesh being cylindrical, connected to the bottom opening and forming a shattering space with the shattering box;
a plurality of fixed cutters, which being mounted on the inner wall of the screen mesh, in an arc shape and having a plurality of cutting strips distributed in the radial direction of the screen mesh; and
a guide hopper; each blade passing through the screen mesh and two adjacent fixed cutters to impact, squeeze, stir, vibrate and shear the phenolic plastics entering from the feeding inlet, and the phenolic plastics passing through the screen mesh entering the guide hopper;
a secondary shattering device, comprising:
a first roller;
a second roller; the first roller and the second roller being rotationally mounted on the supporting frame, and the rotation shafts of the two rollers being arranged in parallel, and separated from a shattering gap located below the guide hopper;
a second transmission rod; and
a set of helical gears; the first motor driving the first roller or the second roller to rotate through the second transmission rod and the helical gears, so that the phenolic plastics falling from the guide hopper being squeezed, cut and grinded in the shattering gap;
a three-stage shattering device, comprising:
a second motor;
a set of tapered blade sets; the tapered blade sets comprising a conical internal cutter and a conical external cutter; the conical external cutter being mounted on the supporting frame and moving along the axial movement of the conical external tool; a plurality of inner cutter teeth arranged around the central axis of the conical external cutter being arranged on the inner wall of the conical external cutter; the inner cutter teeth being bent inclined downward, and the protrusion degree from top to bottom being gradually reduced; and
a plurality of strain sensors; the strain sensors being mounted at the tooth root of the conical external cutter, and being uniformly distributed in the ring, and used for detecting the stress of the phenolic plastics falling into the shattering space from the shattering gap for transverse shearing and longitudinal extrusion; and
an automatic regulating device, being used for adjusting the distance between the conical internal cutter and the conical external cutter by driving the conical external cutter up and down, so as to adjust the stress of the phenolic plastics in the shattering space;
wherein the shattering method comprising following steps:
detecting the stress of the phenolic plastics falling into the shattering space from the shattering gap for transverse shearing and longitudinal extrusion;
determining whether the stress being located in a preset interval;
when the stress being less than the lower limit of the preset interval, driving the conical external cutter up and down to reduce the distance between the conical internal cutter and the conical external cutter;
when the stress being greater than the upper limit of the preset interval, driving the conical external cutter up and down to increase the distance between the conical internal cutter and the conical external cutter; and
when the stress being in the preset interval, maintaining the distance between the conical internal cutter and the conical external cutter.

* * * * *